US008051406B2

(12) United States Patent
Knight et al.

(10) Patent No.: US 8,051,406 B2
(45) Date of Patent: Nov. 1, 2011

(54) RICH END-USER DATA VIEWS

(75) Inventors: Holly Knight, Woodinville, WA (US); Praveen Seshadri, Bellevue, WA (US); Douglas R Pearce, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1424 days.

(21) Appl. No.: 11/096,454

(22) Filed: Apr. 1, 2005

(65) Prior Publication Data

US 2005/0246637 A1 Nov. 3, 2005

Related U.S. Application Data

(60) Provisional application No. 60/567,153, filed on Apr. 30, 2004, provisional application No. 60/567,149, filed on Apr. 30, 2004, provisional application No. 60/567,165, filed on Apr. 30, 2004.

(51) Int. Cl.
*G06F 9/44* (2006.01)
*G06F 3/048* (2006.01)
*G06F 17/30* (2006.01)

(52) U.S. Cl. ......... 717/117; 715/747; 715/765; 707/821
(58) Field of Classification Search .................. None
See application file for complete search history.

(56) References Cited

U.S. PATENT DOCUMENTS

| | | | |
|---|---|---|---|
| 5,446,885 A | 8/1995 | Moore | |
| 5,495,603 A | 2/1996 | Fruchtman | |
| 5,630,127 A | 5/1997 | Moore | |
| 5,751,914 A | 5/1998 | Coley | |
| 5,828,376 A | 10/1998 | Solimene | |
| 5,831,606 A * | 11/1998 | Nakajima et al. | 715/841 |
| 5,917,489 A * | 6/1999 | Thurlow et al. | 715/809 |
| 5,925,108 A | 7/1999 | Johnson | |
| 5,966,707 A | 10/1999 | Van Huben | |
| 6,061,740 A | 5/2000 | Ferguson | |
| 6,133,915 A | 10/2000 | Arcuri | |
| 6,142,684 A | 11/2000 | Kirshenbaum | |
| 6,233,726 B1 | 5/2001 | Bowman | |
| 6,237,135 B1 | 5/2001 | Timbol | |
| 6,266,811 B1 | 7/2001 | Nabahi | |

(Continued)

FOREIGN PATENT DOCUMENTS

WO WO9940512 8/1999

OTHER PUBLICATIONS

G. Kapel, B. Proll, S. Rausch-Schott, and W. Retschitzegger, TriGSflow—Active Object Oriented Workflow Management System, In Proc. Of the 28th Hawaii International Conference on System Sciences, p. 727-736, 1995.

(Continued)

*Primary Examiner* — Michael J Yigdall
(74) *Attorney, Agent, or Firm* — Workman Nydegger

(57) ABSTRACT

A system and/or methodology that enables personalization as a platform service for applications via a rich data view. More particularly, the subject invention provides for a rich data view to be rendered to an end-user whereas management of the data can be effected (e.g., personalized) thereafter. In other words, the invention enables a user to establish and access personalized mechanisms via a rich data view. The personalized mechanisms are based upon rule-based logic with respect to application data types.

18 Claims, 13 Drawing Sheets

U.S. PATENT DOCUMENTS

| | | | |
|---|---|---|---|
| 6,272,521 | B1 | 8/2001 | Jablonski |
| 6,272,559 | B1 | 8/2001 | Jones |
| 6,292,937 | B1 | 9/2001 | Sakata |
| 6,332,163 | B1 | 12/2001 | Bowman-Amuah |
| 6,341,369 | B1 | 1/2002 | Degenaro |
| 6,401,097 | B1 * | 6/2002 | McCotter et al. ............. 707/102 |
| 6,407,753 | B1 | 6/2002 | Budinsky |
| 6,519,597 | B1 | 2/2003 | Cheng |
| 6,633,888 | B1 | 10/2003 | Kobayashi |
| 6,633,889 | B2 | 10/2003 | Dessloch |
| 6,636,845 | B2 | 10/2003 | Chau |
| 6,643,633 | B2 | 11/2003 | Chau |
| 6,734,882 | B1 | 5/2004 | Becker |
| 6,738,964 | B1 | 5/2004 | Zink |
| 6,892,228 | B1 | 5/2005 | Penders |
| 6,944,819 | B2 * | 9/2005 | Banatwala et al. ............ 715/273 |
| 6,965,889 | B2 * | 11/2005 | Serrano-Morales et al. ..... 707/1 |
| 6,976,020 | B2 | 12/2005 | Anthony |
| 7,181,694 | B2 * | 2/2007 | Reiss et al. .................... 715/747 |
| 7,240,072 | B2 | 7/2007 | McKnight |
| 7,310,443 | B1 * | 12/2007 | Kris et al. ..................... 382/167 |
| 7,373,350 | B1 * | 5/2008 | Arone et al. ................... 707/100 |
| 7,409,405 | B1 * | 8/2008 | Masinter et al. ............. 707/102 |
| 7,565,663 | B2 | 7/2009 | Knight |
| 2002/0019886 | A1 | 2/2002 | Sanghvi et al. |
| 2003/0081011 | A1 * | 5/2003 | Sheldon et al. ............... 345/838 |
| 2003/0192027 | A1 | 10/2003 | Porter |
| 2004/0012627 | A1 * | 1/2004 | Zakharia et al. ............. 345/744 |
| 2004/0098357 | A1 | 5/2004 | Higgins |
| 2004/0143604 | A1 | 7/2004 | Glenner |
| 2004/0155901 | A1 * | 8/2004 | McKee et al. ................. 345/747 |
| 2004/0193575 | A1 | 9/2004 | Chen |
| 2004/0205706 | A1 | 10/2004 | Portwood |
| 2004/0216086 | A1 | 10/2004 | Bau |
| 2005/0060281 | A1 * | 3/2005 | Bucher et al. ..................... 707/1 |
| 2005/0091181 | A1 * | 4/2005 | McKee et al. ..................... 707/1 |
| 2005/0222996 | A1 | 10/2005 | Yalamanchi |
| 2005/0223100 | A1 | 10/2005 | Chen |
| 2005/0262481 | A1 | 11/2005 | Coulson |
| 2006/0129584 | A1 | 6/2006 | Hoang |
| 2006/0195411 | A1 | 8/2006 | Knight |
| 2007/0083726 | A1 | 4/2007 | Newton |
| 2007/0150855 | A1 | 6/2007 | Jeong |
| 2009/0138808 | A1 * | 5/2009 | Moromisato et al. ......... 715/758 |

OTHER PUBLICATIONS

B. Grosof and T. Poon, Representing Agent Contracts with Execptions Using XML Rules, Ontologies and Process Descriptions, in Rule Markup Languages for Business Rules on the Semantic Web, Jun. 2002, 22 Pages.

F. Hayes-Roth, Rule-Based Systems, Communications of the ACM, vol. 28, Issue 9, pp. 921-932, 1985.

J. Eisenstein and A. Puerta, Adaption in Automated User-Interface Design, Proceedings of the 5th International Conference on Intelligent User Interfaces, pp. 74-81, 2000.

Thomas Rizzo, WinFS 101: Introducing the New Windows File System, http://msdn.microsoft.com/library/wn-us/dnwinfs/html/winfs 03112004.asp?frame=true, Mar. 17, 2004, 5 Pages, Last viewed on Aug. 23, 2004.

Shawn Wildermuth, A Developer's Prespective on WinFS: Part 1, http://msdn.microsoft.com.library/en-us/dnlong/html/winfsdevpersp.asp?frame=true, Mar. 2004, 12 Pages, Last Viewed Aug. 23, 2004.

Yeh, Brian; Exporting Software and the Extraterritorial Reach of US Patent Law: Microsoft Corp. V. AT&T Corp. CRS Report for Congress, May 31, 2007, Order Code RS22670.

Chamberlain, Xquery: An XML Query Language; Aug. 16, 2002; pp. 597-615.

Office Action dated Dec. 3, 2007 cited in U.S. Appl. No. 10/903,765.
Office Action dated May 30, 2008 cited in U.S. Appl. No. 10/903,735.
Office Action dated Jan. 30, 2009 cited in U.S. Appl. No. 10/903,735.
Office Action dated Feb. 7, 2007 cited in U.S. Appl. No. 10/903,762.
Office Action dated Jul. 24, 2007 cited in U.S. Appl. No. 10/903,762.
Office Action dated Jan. 10, 2008 cited in U.S. Appl. No. 10/903,762.
Office Action dated Oct. 8, 2008 cited in U.S. Appl. No. 10/903,762.
Office Action dated Apr. 29, 2009 cited in U.S. Appl. No. 10/903,762.

Buchi et al., "Compound Types for Java", Aug. 1998, ACM, pp. 362-373.

Xduce: A Typed XML Processing Language, Last Viewed on Aug. 19, 2004, 1 Page, http://xduce.sourceforge.net/.

Y. Leontiev, M.T. Ozsu, and D. Szafron, on Type Systems for Object-Oriented Database Programming Languages, ACM Computing Surveys, vol. 34 Issue 4, pp. 409-449, 2002.

Xquery 1.0: An XML Query Language, W3C, Last Viewed on Aug. 19, 2004, 270 pages, http://www.w3.org/TR/xquery/.

The Xtatic Project: Native XML Processing for C#. Last Viewed on Aug. 19, 2004, 2 pages, http://www.cis.upenn.edu/~bcpierce/xtatic/.

International Search Report and Written Opinion for PCT/US04/24719, dated: Sep. 21, 2007, 3 Pages.

International Search Report and Written Opinion for PCT/US04/25060, dated: May 28, 2008, 4 Pages.

U.S. Appl. No. 11/178,845, mailed Feb. 4, 2011, Office Action.

Maes Pattie, Agents that reduce work and Information overload. Communications of the Association for Computing Machinery, ACM, New York, NY, US. vol. 37 No. 7, Jul. 1994, pp. 30-40, XP002193398. ISSN:0001-0782. 12 pages.

U.S. Appl. No. 11/203,741, mailed Mar. 18, 2008, Office Action.
U.S. Appl. No. 11/203,741, mailed Nov. 6, 2008, Office Action.
U.S. Appl. No. 11/203,741, mailed May 5, 2009, Notice of Allowance.
U.S. Appl. No. 11/178,845, mailed Dec. 22, 2009, Office Action.
U.S. Appl. No. 11/178,845, mailed Jul. 8, 2010, Office Action.
U.S. Appl. No. 11/178,845, mailed Nov. 10, 2010, Office Action.

* cited by examiner

RICH END-USER DATA VIEWS

CROSS-REFERENCE TO RELATED APPLICATIONS

This application clams the benefit of U.S. Provisional Patent Application Ser. No. 60/567,153 entitled "END-USER APPLICATION CUSTOMIZATION USING RULES", filed on Apr. 30, 2004, U.S. Provisional Patent Application Ser. No. 60/567,149 entitled "DERIVED SET—A RULES-BASED QUERY-LIKE MECHANISM THAT DEFINES CONTENTS OF A COLLECTION" filed on Apr. 30, 2004, and U.S. Provisional Patent Application Ser. No. 60/567,165, entitled "RULES FRAMEWORK FOR DEFINITION AND EXECUTION OF END-USER RULES LOGIC", filed on Apr. 30, 2004. This application is also related to co-pending U.S. patent application Ser. No. 10/903,765 entitled "RULES FRAMEWORK FOR DEFINITION AND EXECUTION OF END-USER RULES LOGIC" filed on Jul. 30, 2004, co-pending U.S. patent application Ser. No. 10/903,762 entitled "END-USER APPLICATION CUSTOMIZATION USING RULES" filed on Jun. 30, 2004, and co-pending U.S. patent application Ser. No. 10/916,718 entitled "DERIVED SET—A RULES-BASED QUERY-LIKE MECHANISM THAT DEFINES CONTENTS OF A COLLECTION" filed on Aug. 12, 2004. The entireties of the above-noted applications are incorporated herein by reference.

TECHNICAL FIELD

This invention is related to software that facilitates rich end-user data views, and more specifically, to an end-user programmable rules abstraction platform that facilitates incorporation of end user or developer defined rule-based logic into rich data views and controls provided by applications.

BACKGROUND OF THE INVENTION

Computers and computing have always divided the world of users into two classes: the knowledgeable "high priests" who know how to use computers in complex ways, to shape programs and enable behaviors that are valuable and rich; and the novice users, who are at their mercy, denied easy or cheap access to knowledge or information or the education to make computers serve their needs well. However, major breakthroughs in computing have occurred when technology has broken down some of these barriers to access.

In the world of the mainframe, computers were too expensive for all but the largest businesses to afford. The advent of mini-computers, and then personal computers (PCs), broke down the cost barrier and made computers available to small businesses and individuals.

In the 1980's, programmers struggled to build graphical user interface (GUI) applications, and without rich and consistent GUIs, were unable to build valuable applications for PC users. The Visual Basic revolution and the use of controls and event-based GUI construction enabled a whole army of application developers who could easily build rich applications. This also established a virtuous cycle with many more end-users who could exploit these applications.

In the 1990's, end-users struggled to overcome a lack of access to information. The growth of the Internet and the web transformed this space, making almost all valuable information accessible to anyone with a browser. However, there are still significant barriers to overcome.

Computing is not personal. There is very little about a PC that is truly "personal". The data on the local disk is personal. However, the behavior of the machine (what it does on behalf of the user) is close to identical across millions of users. Despite owning an amazingly powerful general purpose computer, the average user treats it as a static tool, useful as a communication end-point, useful as a search entry-point, useful to execute some canned mass-market applications, but otherwise incapable of any "personal computing" in the true sense of the word. The personalization capabilities available in current applications just scratch the surface of what is possible and desirable.

Computing is manual. Consider the daily routine of most typical computer end-users. The PC gathers information, reacts to communications, makes decisions and acts upon them-initiates or responds to communications, organizes information, buys and sells goods, travel, etc. Computers have improved communication between people, and have improved access to information. However, PCs have done little to relieve the end-user's responsibility to make decisions and act upon them at the right time. In the business world, there are decision support systems for major organizational decisions. Still software does not help the average PC user in the many everyday, yet important and personal decisions.

Computing is not contextual. Computer software typically provides optional settings that are rather static and unrelated to the actual context of the user (e.g., "Why should I have the same set of messaging buddies at work and at home?"). Thus, users are still in the "pre-industrial age" of software by being increasingly trapped in the tyranny of manual information processing-spending hours every day sifting, sorting, searching, and reacting to e-mail, documents and other personal data.

End-user software should be personalized, aware of the needs and preferences of the end-user, acting specifically in a manner guided by those needs and by the user context. Further, computer systems and software should provide every end-user with a personal executive assistant who works 24 hours a day gathering and sifting information of interest to the end-user, and reacting to that information.

The most valuable class of end-user computing activity deals with information flows and search, such as ensuring the end-user sees relevant information (e.g., "Tell me if there is a school closing due to bad weather."), enhancing person-to-person communication with personalized behavior (e.g., "If I'm out of the office when my wife calls, let her know when I'll be back."), ensuring important information is not lost (e.g., "If there's an urgent e-mail, make sure it gets forwarded to me on my mobile device."), and automating the management of information (e.g., "As new photographs arrive, place them in the right folders and shares based on their timestamp, GPS location, and any relevant calendar entries."). Moreover, interaction with the computer should provide end-user programmable enhancements in a user-friendly manner. For example, end-user programmed customizations should be available at a platform level whereby the customizations can be accessed in any application. Thus, a user experience can be more customized to specific end-user preferences and the like.

The way to accomplish this is to provide mechanisms by which an end-user can "program" (e.g., customize) the behavior of the computer. However, traditional programming languages are clearly not the answer, in that the end-user is not a trained developer. What is needed is an improved mechanism that allows an end-user to personalize applications. To this end, the file store explorer and/or other application can provide a user with rich data views.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system and/or methodology that enables personalization as a platform service for applications to enable rich data views defined or extended by end users and other developers. More particularly, the subject invention provides for a rich data view can be rendered to an end-user whereas management of the data can be effected (e.g., personalized) thereafter. In other words, the invention enables a user to establish and access personalized mechanisms within a rich data view. In accordance with the invention, an application can get richer, more consistent and extensible by allowing end users and developers to provide rule-based logic within the context of an application.

The personalized mechanisms generated via the rich data view can be applied to data types in countless disparate applications. It is be appreciated that many aspects of data management are the same or similar across varying applications. For example, aspects including, but not limited to, search criterion, data set definition, property editing and property annotation mechanisms share commonality that can be streamlined across countless applications.

In another aspect, this invention is directed to an end-user programming platform that can provide interoperable services and structures for data to assist in addressing end-user issues and/or desires. For example, aspects of the invention are directed to mechanisms for organizing and locating information. Other aspects are directed toward distinguishing relevant information to assist in prevention of information overload thus making the management of a vast amount of data manageable. Still other aspects are directed to automating repetitive and time-consuming tasks with respect to data. It is a novel feature of the invention to enable these and other data management/manipulation to be end-user programmed and/or generated to provide a rich data view.

The invention can push information identified by the end-user into a platform whereby the end-user can generate programs with respect to the information thus permitting access to these programs within rich data views of the disparate applications. In this manner, shared end-user applications (e.g., programs) associated to the platform can enable a level of application interoperability that is not available in conventional platforms. By way of example, if a view is defined by an end user (e.g., with additional personalized definitions of columns also provided by the end user) this "view" of the data can be shared and exposed within the context of an application that is different from the original application employed while defining the view.

In another aspect of the invention, a learning component can be provided that facilitates the application learning end-user behavior, and captures the behavior in the form of rules. Accordingly, customization components can be automatically generated through inference and/or prediction of a user preference/action.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
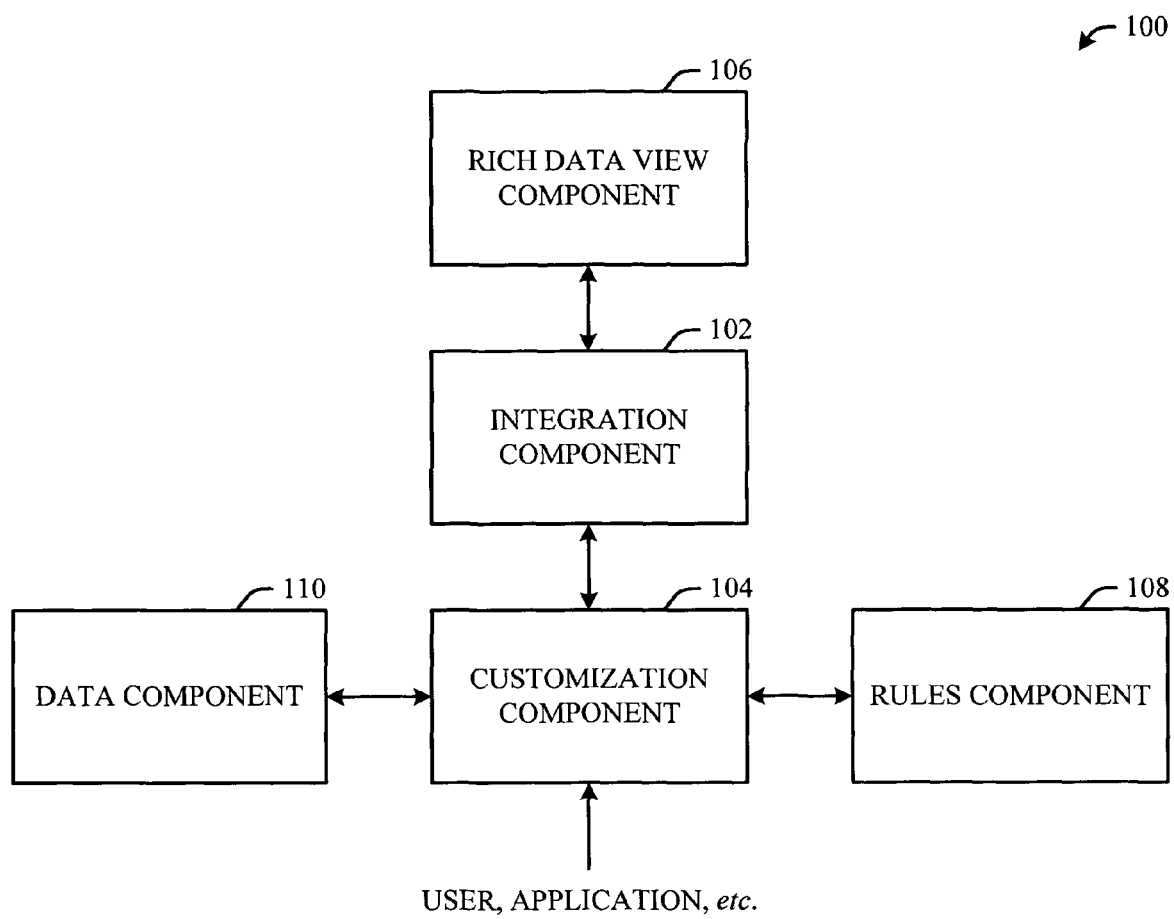
FIG. 1 illustrates a system that facilitates integration of a customization component into a rich data view in accordance with an aspect of the invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention is directed to a system and/or methodology that enables personalization as a platform service for applications whereby a rich data view can be rendered to an end-user. In other words, the invention enables a user to establish and access personalized mechanisms via the application UIs which use of the rules platform to produce rich data views. These mechanisms can be applied to data types in countless disparate applications. It will be appreciated that many aspects of data management are the same or similar across varying applications. For example, aspects including, but not limited to, search criterion, data set definition, property editing and property annotation mechanisms share commonality that can be streamlined and shared across applications. The personalized mechanisms can be active or automated logic mechanisms where the logic can be used to compute relationships between objects based on links or common value relationships.

This invention is directed to an end-user programming platform that can provide services and structure for data to assist in addressing end-user issues. For example, aspects of the invention are directed to mechanisms for organizing and locating information. Other aspects are directed toward distinguishing relevant information to assist in prevention of information overload thus making the management of a vast amount of data manageable. Still other aspects are directed to automating repetitive and time-consuming tasks with respect to data. These and other aspects will be discussed in greater detail below.

To accomplish the foregoing, the invention can push information identified by the end-user into a platform whereby the end-user can generate programs with respect to the information thus permitting access to these programs via rich data views of the disparate applications. In this manner, shared end-user applications (e.g., programs) associated to the platform can enable a level of application interoperability that is not available in conventional platforms.

Referring initially to FIG. 1, a system 100 that enables a level of application interoperability of an aspect of the invention is shown. Generally, system 100 can include an integration component 102, a customization component 104 and a rich data view component 106. As described supra, the integration component 102 facilitates exposing the customization component 104 to the rich data view component 106. As will be described in greater detail below, the integration component 102 can facilitate exposing the end-user programming (e.g., customization component 104) via various disparate applications (not shown). In other words, the integration component 104 can facilitate enabling an end-user customization platform whereby customization component 104 can be integrated into disparate views (e.g., rich data view component 106).

The customization component 104 enables a user to program a rules component 108 that interacts with a data component 110 in a defined manner. It will be appreciated that a rule can represent an item, an end-user datum or a declarative function. More particularly, a rule can effect management of data based upon type. By way of example, a rule can manipulate data in the following manner: ON input of type IF condition THEN results.

In this example, when data of a particular type is received, the end-user can program a rule to perform an action if a particular condition is met. For example, if an email is received from a particular person, a rule can be programmed to automatically change the color of the text of the email thus, enhancing the rendering of this correspondence. The invention builds upon the rules infrastructure in that it enables a platform whereby rules can be shared between applications and rendered via the rich data view component 106.

Every rule can have a signature defining input and resultant types of data. The input can be a schematized file store item. The condition can be a Boolean expression. Therefore, the allowed base conditions can be driven by the schema. It will be understood that a rich set of conditions can be permitted. A more detailed discussion of the rules architecture is provided infra as well as in the aforementioned Related Applications that are incorporated by reference herein.

The Related Applications identified above and incorporated herein essentially define the infrastructure elements related to rules based end-user programming. This invention is directed to a novel platform that enables disparate applications to consistently make these end-user programmed elements (e.g., rules) available via integration component 102. In other words, in accordance with this invention, a particular end-user programmed element can be used or reused amongst a variety of applications without the burden of programming or re-defining the element. In accordance with aspects, applications can facilitate defining rules. Effectively, the subject invention can be thought of as a visual programming aid for end users whereby, an end user can define sets, edit properties, generate tasks, etc., that can be employed within disparate applications (e.g., via a rich data view of an application). For example, pull-down menus, click/drag operations or the like can be used to facilitate the end-user to accomplish the foregoing.

Basically the infrastructure of the integration component 102 can enable, at runtime, the creation of a rich data view that includes end-user defined properties (e.g., customization component 104) that extend functionality available for a particular data type. As will be appreciated, this extended functionality can include end-user and third-party developer defined rules-based customizations that enhance the functionality provided by the application developer. For example, when employing a standard file store explorer, the user can be presented with additional customized options that enable sorting, manipulating, editing, etc.

Conventionally, as previously stated, these options were hand-coded by a developer. Accordingly, the end-user did not have the ability to modify the functionality. However, this invention provides the mechanisms to enable end-user programming and functionality to be integrated into applications via a common platform (e.g., file store).

The following examples and scenarios are provided to add context to the invention. It is to be appreciated that these examples and scenarios are not intended to limit the scope and/or functionality of the novel interoperability of the invention. Aspects of the following examples and scenarios are directed to the incorporation of end-user programming into a rich data view associated with a file store explorer application. It is to be understood that this file store explorer application aspect is not intended to limit the invention in any way. It will be appreciated that the platform functionality described herein can be applied to countless varieties of applications and corresponding rich data views.

Rating Data Properties

By way of example, suppose a store explorer can display image data files. Accordingly, the file store explorer can identify the types of data files associated with photos. With this invention, the file store explorer (e.g., via integration component 102) can thereafter identify applicable end-user data and processes associated with the data types. Although a disclosed aspect is directed to a file store explorer application, it is to be appreciated that the end-user customization and integration functionality can be employed in accordance with any application where the end-user functionality is applicable and/or desired. By way of further example, assume a user applies a star-rating of the photos within the file store explorer. This star-rating scheme can be employed and integrated into a photo editor application whereby a user can access these predefined ratings via a rich data view or UI browsing mechanism.

Figure 2:
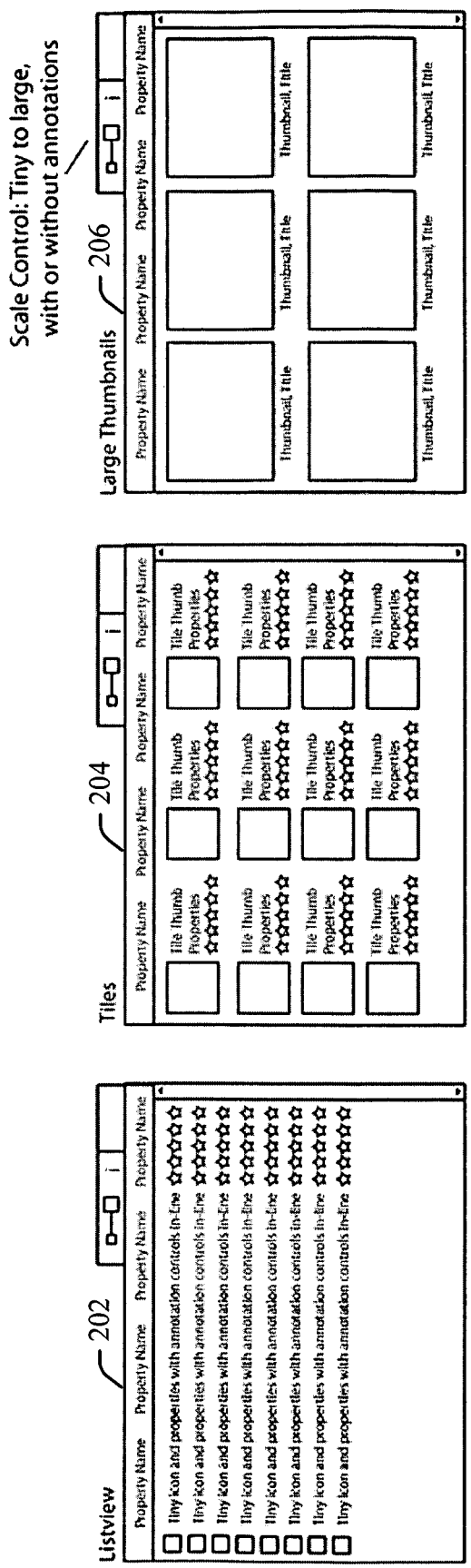
FIG. 2 illustrates three exemplary rich data views that depict data ranking in accordance with an aspect.

FIG. 2 illustrates exemplary aspects of rich data views that depict the rating of data properties. In particular, three disparate views are shown, a list view 202, a tiles view 204 and a large thumbnails view 206. As illustrated, it will be appreciated that each rich data view shown can employ a rating property of data to construct a dataset prior to rendering. As described, this end-user rating (e.g., star rating) mechanism can be maintained at an end-user programming (EUP) platform level whereby the rule-based mechanisms can be universally applied to any rich data view desired.

Continuing with the file store explorer example, photos can be manually or automatically star-rated in accordance with an end-user preference. In one aspect, a user can rate the photos manually. In another aspect, the photos can be rated based upon pre-defined end-user criteria (e.g., rule) associated with the metadata of the photo. It will be appreciated that an integral component to the rich data aspects of the invention is a consistent base type for an item in the file store. Accordingly, types can be derived from the consistent base type. Therefore, the application, via integration component 102, can associate properties to the derived types and can also associate end-user defined types and properties with the base type.

In accordance with the invention, a user can program an application to render the disparate view components illustrated in FIG. 2 in any desired order. Additionally, the user can control association of the three exemplary views with a particular type (e.g., photos). In other words, in the file store explorer example, when a user selects to view image files, the three exemplary views of FIG. 2 can be made available and rendered.

In the past, only information that the developer knew about could be coded. With this invention, end-user criteria (e.g., star-ratings) and preferences can be coded, incorporated into an application and rendered in a rich data view. The infrastructure of the subject invention provides extensibility and reflection that enables looking at the designer's (type designer, independent software vendor (ISV), end-user, etc.) associations to a particular type. To be able to employ the associations, the invention can provides a framework (e.g., shell) that enables rendering this information to a user within an application.

Datasets

In another aspect, customized data sets can be defined. For example, a user can define a query that identifies a particular defined subset of data. In one aspect, a user can define "my contacts" or "my personal contacts." In accordance therewith, disparate applications can take advantage of and employ these defined criteria. As described previously, the rules infrastructure can provide these definitions and, through reflection, the subject invention can enable an application to access these defined mechanisms. The application can employ these mechanisms accordingly by populating the application pane (e.g., rich data view) with the end-user data in addition to the type designer or base type data. As described supra, the subject invention can provide for capability of a standardized framework, standardized extensibility for end-users, standardized mechanism that determines the intent of end-users around data, and a mechanism that gives programming control to the end-user.

Actions/Tasks

In another example, actions and/or tasks can be programmed by an end-user and associated with a particular type and/or dataset. Continuing with the example of viewing image data files by employing a file store explorer, a task such as red eye reduction can be automatically presented when viewing file types associated with photos. A task button can be added to the file store explorer that effects the action of reducing red eye effects on the photos.

As stated previously, a novel aspect of the invention is to associate a particular end-user defined mechanism (e.g., rule, customization component 104) to a particular file type. Additionally, it is a novel aspect of the invention to enable extensibility of these mechanisms whereby, the end-user mechanisms can be employed at a platform level and incorporated into disparate applications without the need to code or re-code. These mechanisms can be incorporated into a rich data view within the application.

Different Views

In accordance with the specialized end-user mechanisms, file store explorer views can be employed that enhance the ability to organize and/or manage data. In one aspect, a timeline-type data visualization mechanism can allow a user to inspect a timeline in order to locate documents. It is to be understood that the end-user can specify any data property (e.g., date, type, . . . ) whereby the rich data view can dynamically render data in accordance with the selection.

In accordance with a timeline-type view, a user can inspect a timeline and visualize a number of documents in a particular time period. It is to be appreciated that the population of the view can be dynamically based upon end-user defined mechanisms (e.g., rule). With this specialized view, an assumption can be made that the document being searched might be located in that particular time period.

Referring back to the file store explorer example, the EUP platform of the subject invention provides several novel services to the shell (e.g., rich data view) and other applications. As previously described, these novel services can include a mechanism for determining user-visible types and the user-visible properties for those types (while addressing the extensibility of these types by ISVs and end-users). The subject invention can also facilitate providing a mechanism for defining and persisting queries whether navigational (created through stacking and filtering) or explicit (using a query builder application). As well, the invention can facilitate exposing and extending (by ISVs and end-users) active behaviors (e.g., tasks) associated with file store types.

It is to be appreciated that countless rich data view examples exist however, it is to be understood that the novel EUP platform integration of the invention can be employed with any of the countless examples that exist. In accordance with the invention, rules can be used to store and relate relationships that are displayed in a particular view. These relationships can be described in the rules algebra however, use of relationships (e.g., link based or CVR (common value relationship)) based to control views and defined by end users is particularly powerful. Essentially, the invention can enable the end user to define relationships that the original type authors or application authors had not imagined.

Figure 3:
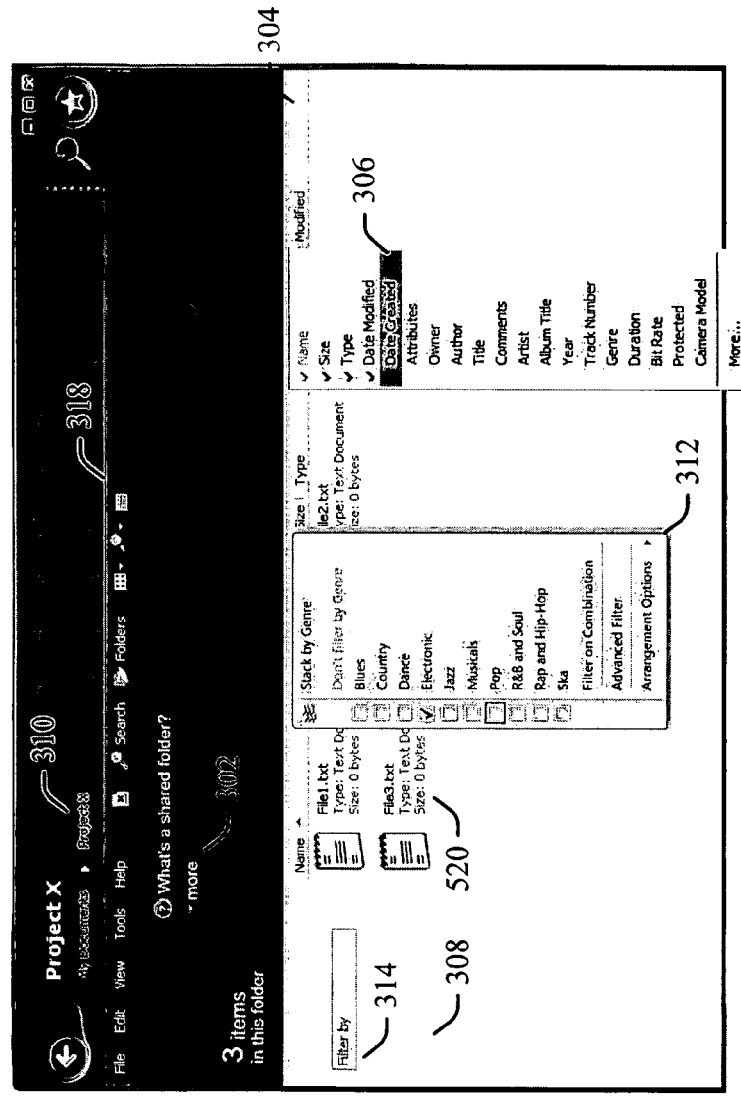
FIG. 3 illustrates an exemplary user interface (UI) in accordance with an aspect that allows users to define a rich view of data.

FIG. 3 illustrates an exemplary UI that facilitates the aforementioned novel features using an EUP layer in accordance with a disclosed aspect. With respect to user visible types and properties, the UI 300 of FIG. 3 can reflect over properties 302 from out-of-the-box (OOTB) properties, ISVs (e.g., new and extended), and end-user defined properties. More particularly, in this example, property columns can be rendered at 304, property column picker at 306, and property tree at 308.

Turning now to the query definition elements of FIG. 3, the breadcrumb bar 310 can reflect over filters that apply from OOTB, ISVs and end-users. At 312, the system can reflect over properties from OOTB, ISVs and end-users. These properties can be shown as a filter on property column values. Autolists that represent queries for items and can constrain the set of relevant types can be illustrated at 314. A query builder that reflects over properties, operators and filters from OOTB, ISVs and end-users can be deployed at 316.

Active behaviors can include tasks and item contextual menus. More particularly, tasks that reflect over actions from OOTB, ISVs and end-users can be placed at 318. The item contextual menus at 320 can reflect over actions from OOTB, ISVs and end-users.

User Visible Types and Properties

Figure 4:
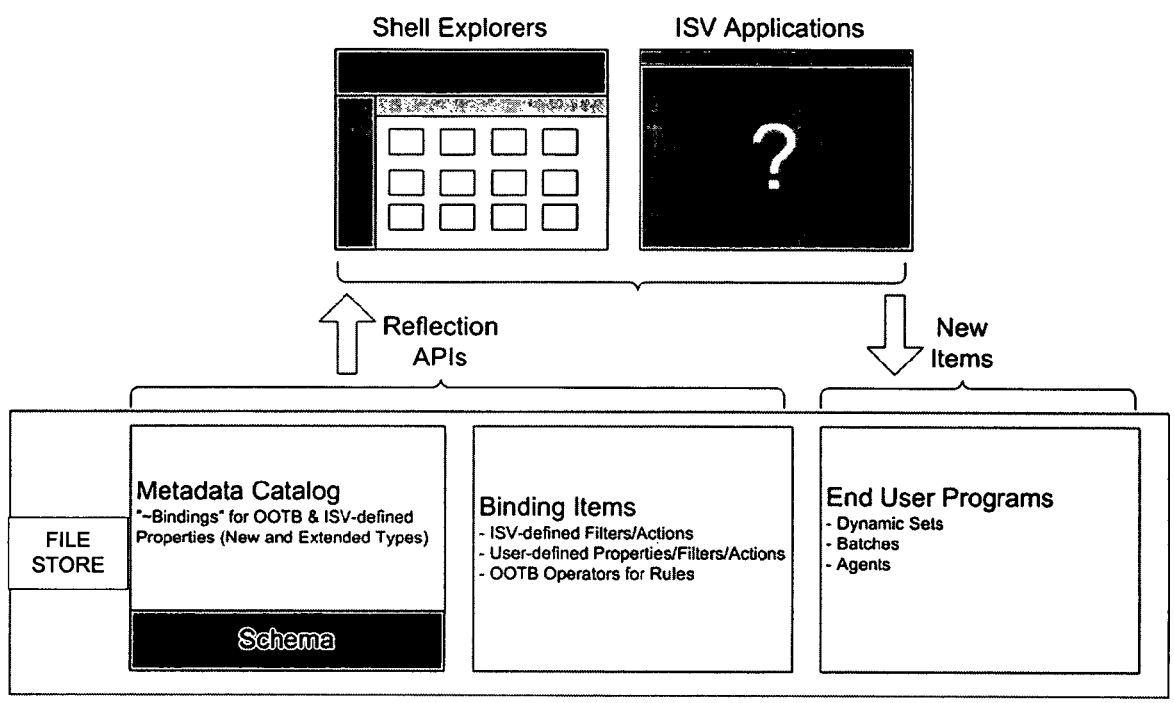
FIG. 4 illustrates how the exemplary drop down lists of FIG. 3 are generated in accordance with an aspect.

Referring now to a more detailed discussion of user visible types and properties, as described supra and with reference to FIG. 4, end-users can define queries atop user visible item types and their properties. To determine the set of properties visible to end-users and for which types, applications can query the set of property bindings in the file store. The set of property bindings includes (and can be divided by) properties defined OOTB, ISVs, and end-users themselves. Regardless of the source of a property binding, all can appear in the manager shell where end-users can stack and filter over them.

Property bindings can serve the purpose of simplifying file store schema for end-users both by excluding file store properties that end-users do not need to see and also by flattening schema hierarchy in places where it may be too complex for end-users to comprehend (e.g., consider "Email from" for example). Property bindings (like other binding types) are localizable and associated directly with file store schema types.

Developers can declare and manage property bindings along with the file store schema. At install time, the declarations are compiled into binding items that live in the file store metadata catalog. Likewise, ISVs can define property bindings for new schema and add property bindings to existing schema using extensions.

FIG. 4 illustrates the locations and types of binding items in the file store available to file store explorers and other applications. As well, FIG. 4 illustrates that the shell and other applications (e.g., ISV applications) include user visible properties that can originate from OOTB, be defined by ISVs, and defined by end-users.

User Defined Properties

User-defined properties can allow end-users to personalize how they annotate and view file store items. The EUP platform can enable end-users to define two types of properties: static and computed. Static properties can be defined as property bindings and associated with a specific file store type. Values of static properties can be stored and associated to a given item. End-users can automatically annotate data using computed properties defined as rules using a query building user interface.

Figure 5:
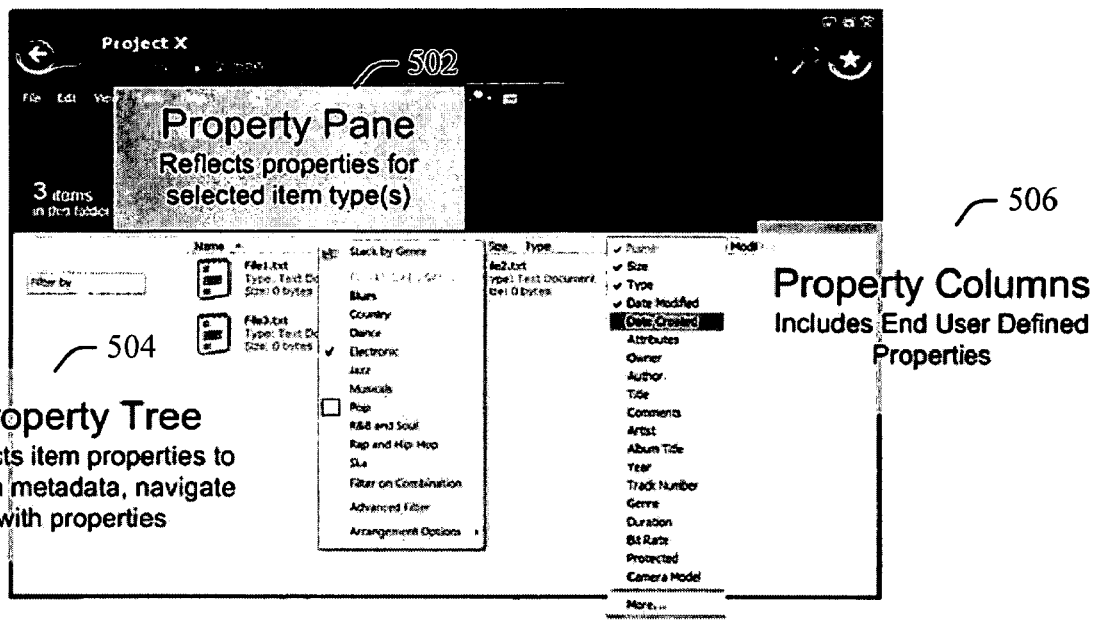
FIG. 5 illustrates which bindings and reflections are used for each part illustrated in FIG. 3.

As shown in FIG. 5, in one aspect, a shell can take advantage of end-user defined properties in a number of locations: the Property Pane 502, Property Tree 504, and Column picker 506. It is to be understood that these locations (502, 504, 506) can represent file store explorer touchpoints for end-user defined properties. The property pane 502 can reflect on properties for selected item type(s). The property tree 504 can reflect item properties to assign metadata and navigate within properties. With respect to the property columns 506, as illustrated, this location can include end-user defined properties.

Autolists, Property Bindings and Rich Application Views (RAV)

Figure 6:
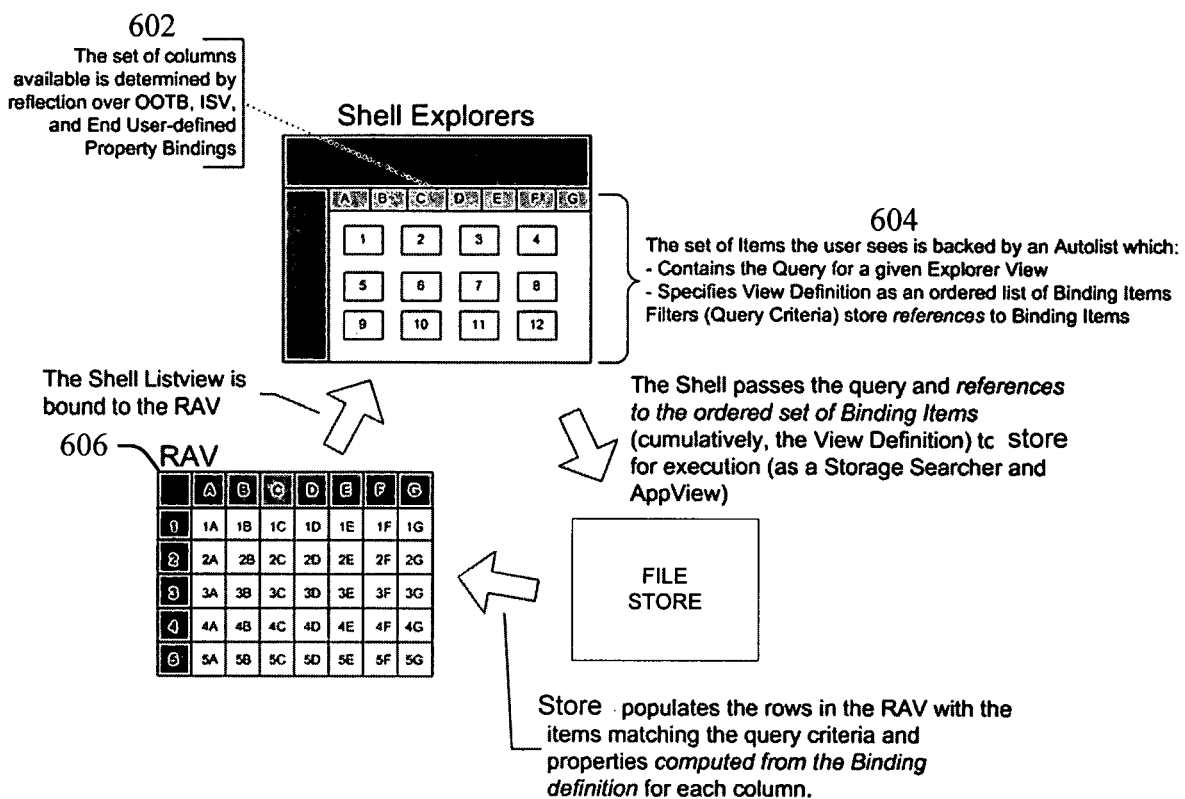
FIG. 6 illustrates how a view with a subset of the data in the store is rendered within an item/data/file explorer pane in accordance with an aspect of the invention.

Shell explorers can build directly on autolists and property bindings to provide a consistent and extensible user experience. FIG. 6 illustrates the relationship of property bindings, autolists, and the RAV tables. This diagram shown in FIG. 6 illustrates how a view with a subset of the data in the store is rendered within an item/data/file explorer pane. RAVs are an efficient view mechanism that allow paging, cursoring, grouping and sorting of result data. In more detail, the set of columns 602 (e.g., properties) available for stacking/filtering are gathered through the reflection application program interfaces (APIs) from FIG. 4 over OOTB, ISV and end-user property bindings. The set of items rendered to the user can be persisted in an autolist 604 along with the view definition(s). It will be appreciated that the view definition represents an ordered set of references to binding items.

Filters stored in an autolist (or elsewhere) refer to binding items. In one aspect, filters do not store the definition of the binding. In operation, a RAV table 606 is created and populated with the set of items matching the query and the properties that are computed from a lookup of the binding definition for each column. Accordingly, the shell list view is bound to the RAV as illustrated.

Query Definition

Figure 7:
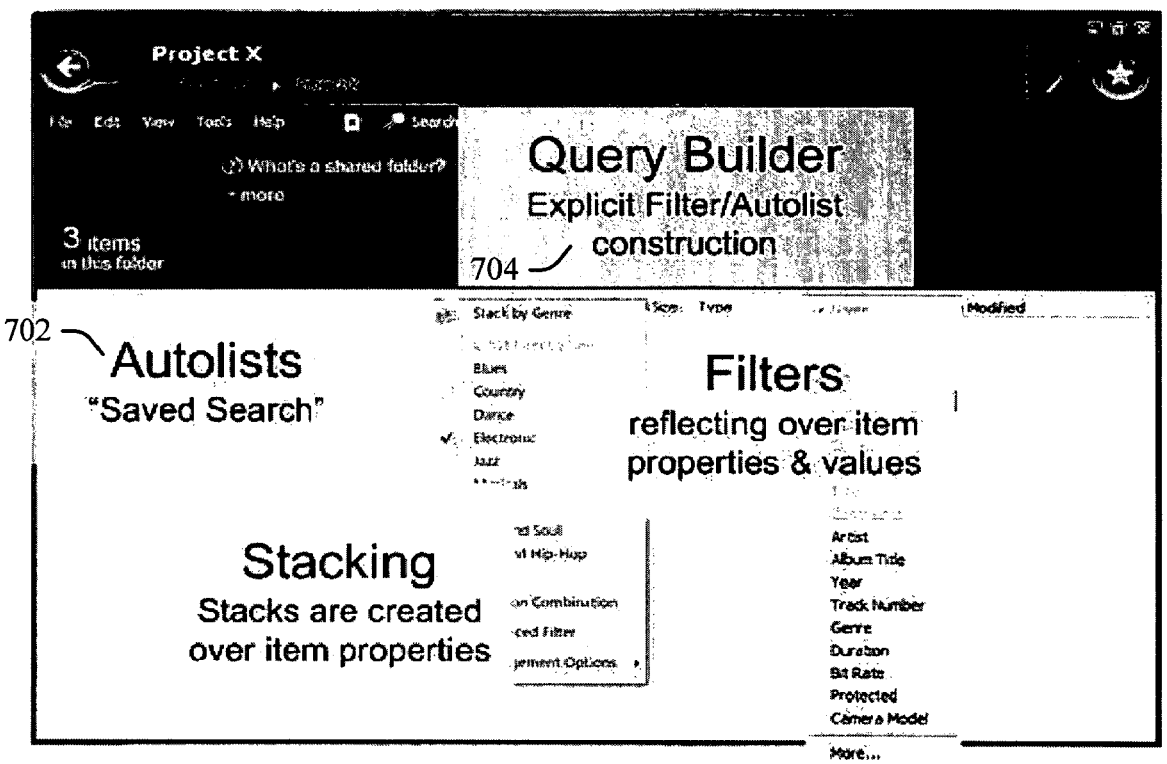
FIG. 7 illustrates an exemplary rendering of elements within an application in accordance with an aspect of the invention.

As described supra, a query can be constructed through implicit or explicit techniques. Essentially, navigation can refer to an implicit method for end-users to build queries while a query builder can provide an explicit means of doing the same. FIG. 7 illustrates common elements for implicit and explicit query building. More particularly, FIG. 7 illustrates an exemplary rendering of elements within an application in accordance with the invention. Both methods can utilize the same objects in memory and when persisted. As users stack and filter in file store explorers, autolists and filters can be constructed in memory. As illustrated at 702, end-users can save the view at any given time (as a file store autolist item) and return to as desired. Since shell navigation is built on property bindings, filters, and autolists, end-users and ISVs can benefit from extensibility, customization, and composition/reuse.

While stacking and filtering can serve the purposes of reducing the set of items in a view based on simple equality clauses (e.g., where Author is "Bob"), a query builder 804 can allow end-users to expand the set of items in the view, express more complex conditions (e.g., ranges), and use composition to take advantage of existing sets (e.g., where Author is one of "My co-workers").

While the query builder 704 can be employed by more advanced users, both it and the file store explorer can function over the same, user-editable autolist objects. Additionally, autolist items (essentially simple end-user programs) can be synchronized and shared along with other file store items.

Active Behavior (Actions & Automation)

Figure 8:
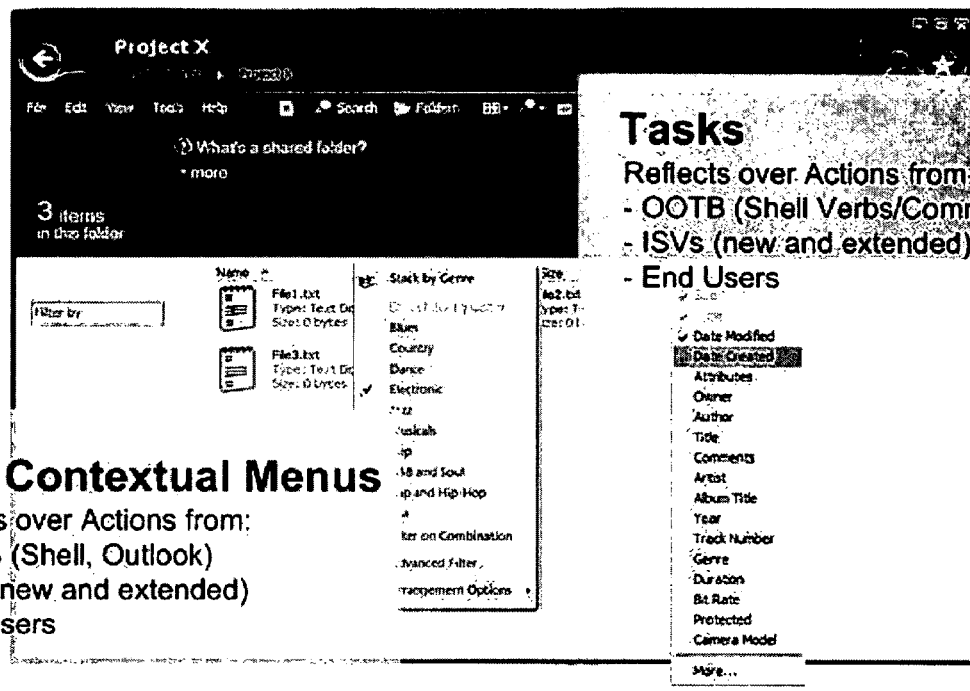
FIG. 8 illustrates elements of consistent extensibility for applications in accordance with an aspect of the invention.

Turning now to FIG. 8, active behaviors in the EUP platform can include actions (OOTB, ISV, and end-user defined), batches, and agents. While actions can essentially be the tasks and right-click menus in the shell today, actions in the EUP platform can be specifically designed for personalization, composability, and automation. End-users can create new actions by adding conditional filters or naming an ordered series of actions to run in a sequence. Associating actions with a set creates a batch, an action bound to a specific set of items that users need only invoke. Associating actions with an event and a set of items creates an agent, an automated set of logic that runs over the set of items when the given event occurs. In any case, it is to be appreciated the active behavior can be based upon an end-user defined rules infrastructure. It is to be appreciated and understood that active and automated use of rules is described in more detail in the above-identified Related Applications, which are incorporated herein by reference.

The EUP platform of the invention can support at least three types of actions on file store types. The first allows schema developers to define logic directly available from the type. The second allows developers to define code outside of the file store that extends what end-users can do with file store items (e.g., "Remove Red Eye" for photos). The third type of action allows either developers or end-users to take advantage of file store metadata by automating property settings on file store items. For end-users, automatic property setting is one key to addressing the information overload problems that can come from storage at scale. As an example, consider the value of email application rules used to set colors, flags, and alerts for mail from important contacts. The EU platform of the subject invention can extend these application specific scenarios into an interoperable platform whereby, an end-user can create, access and employ such rules (e.g., customizations) from disparate applications (e.g., via rich data view). A novel feature of the invention is that actions and automations can appear within an application UI to allow customization and personalization of the UI.

Of the three types of actions identified above, the set exposed through action bindings can be available everywhere an application reflects over what actions apply to a given type. ISVs can extend this set by providing new action bindings, and (as with user defined properties) end-users can extend the set of actions available by composing new actions with rules.

Figure 9:
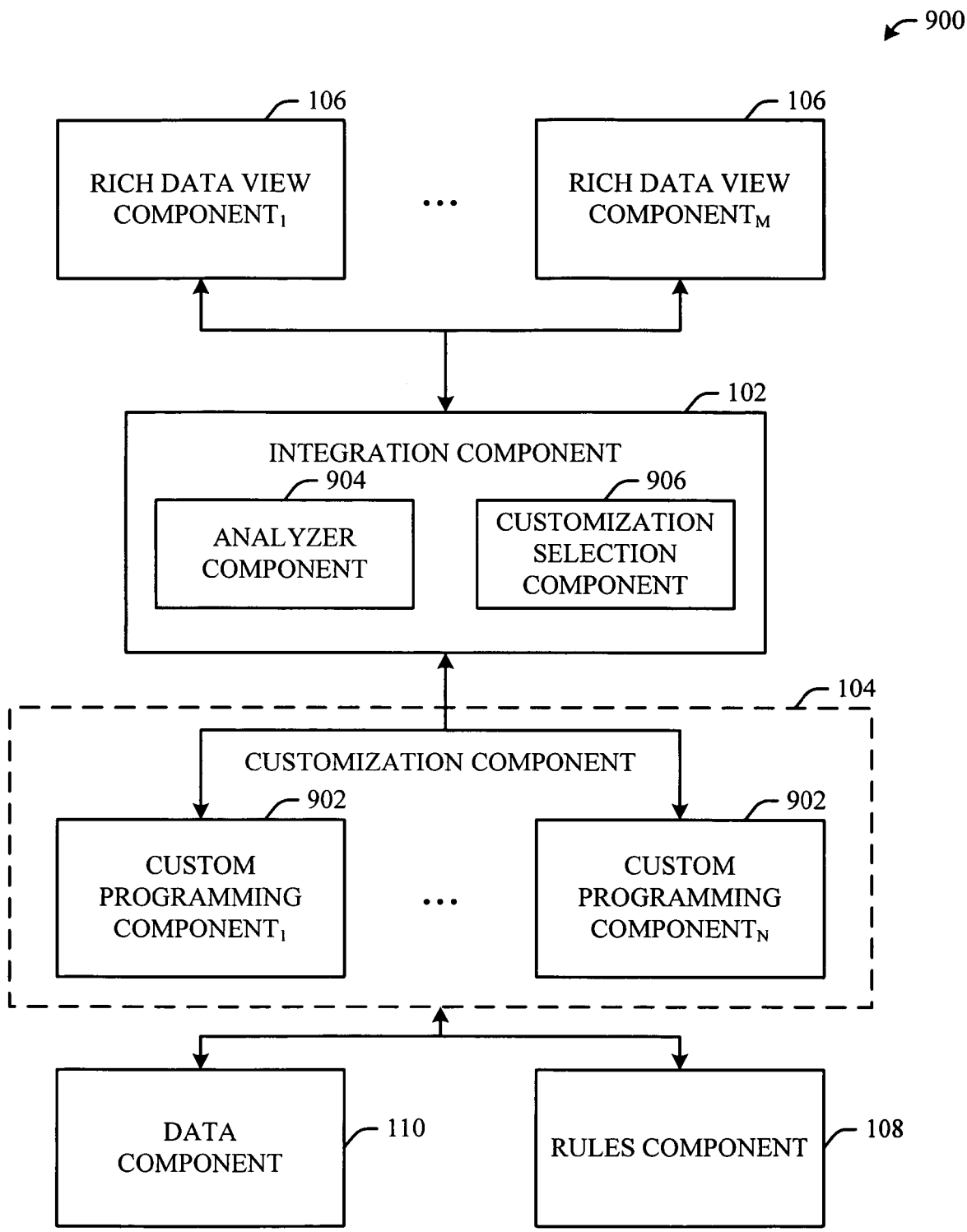
FIG. 9 is an exemplary aspect of a system that demonstrates that multiple customizations and resulting rich views are possible in accordance with the invention.

Referring now to FIG. 9, an architectural diagram of a system 900 that facilitates integrating custom end-user programming into an application is shown. More particularly, FIG. 9 demonstrates that multiple customizations and resulting rich views are possible in accordance with an aspect of the invention. Generally, the system 900 can include the integration component 102, the customization component 104 and the rich data view component(s) 106. The integration component 102 can facilitate access to the customization component 104 from 1 to M rich data views, where M is an integer. As illustrated, it is to be appreciated that 1 to M rich data views can be referred to collectively or individually as rich data views 106.

The customization component 104 can include 1 to N custom programming components, where N is an integer. Custom programming components 1 to N can be referred to collectively or individually as custom programming components 902. In one aspect, the integration component 102 can include an analyzer component 904 and a customization selection component 906. The analyzer component 904 can analyze characteristics (e.g., type, function) to determine appropriate custom programming components 902 to render. Once identified, the customization selection component 906 can effect incorporating the custom programming component 902 into the rich data view component 106.

Figure 10:
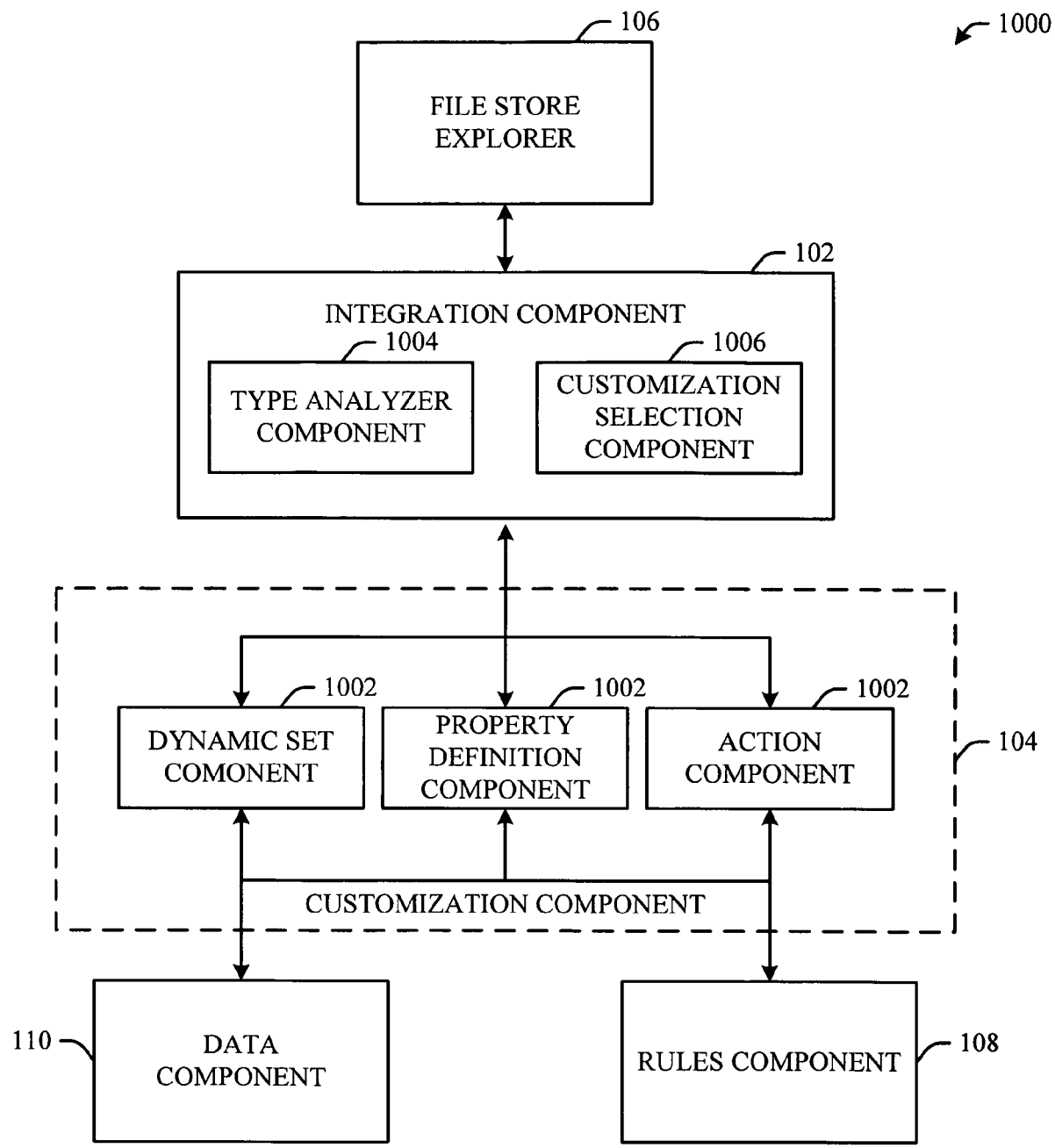
FIG. 10 is an exemplary file store explorer aspect that employs a dynamic set component, property definition component and an action component in accordance with an aspect.

With reference now to FIG. 10, an aspect in accordance with the file store explorer described supra is shown. More particularly, the system 1000 can include three (or more) custom programming components 1002, e.g., a dynamic set component, a property definition component and an action component. Each of these components can have the functionality described earlier. In operation, an end-user can configure the custom programming components 1002. Accordingly, each custom programming component can employ the rules component 108 in relation to the data component 110 as desired.

At runtime, in accordance with the file store explorer application, the integration component 102 can analyze the type(s) of the instant data and thereby employ the customization selection component 1006 to select the appropriate custom programming components 1002. As described above, it will be appreciated that this determination can be made based on type information obtained from the application data.

Figure 11:
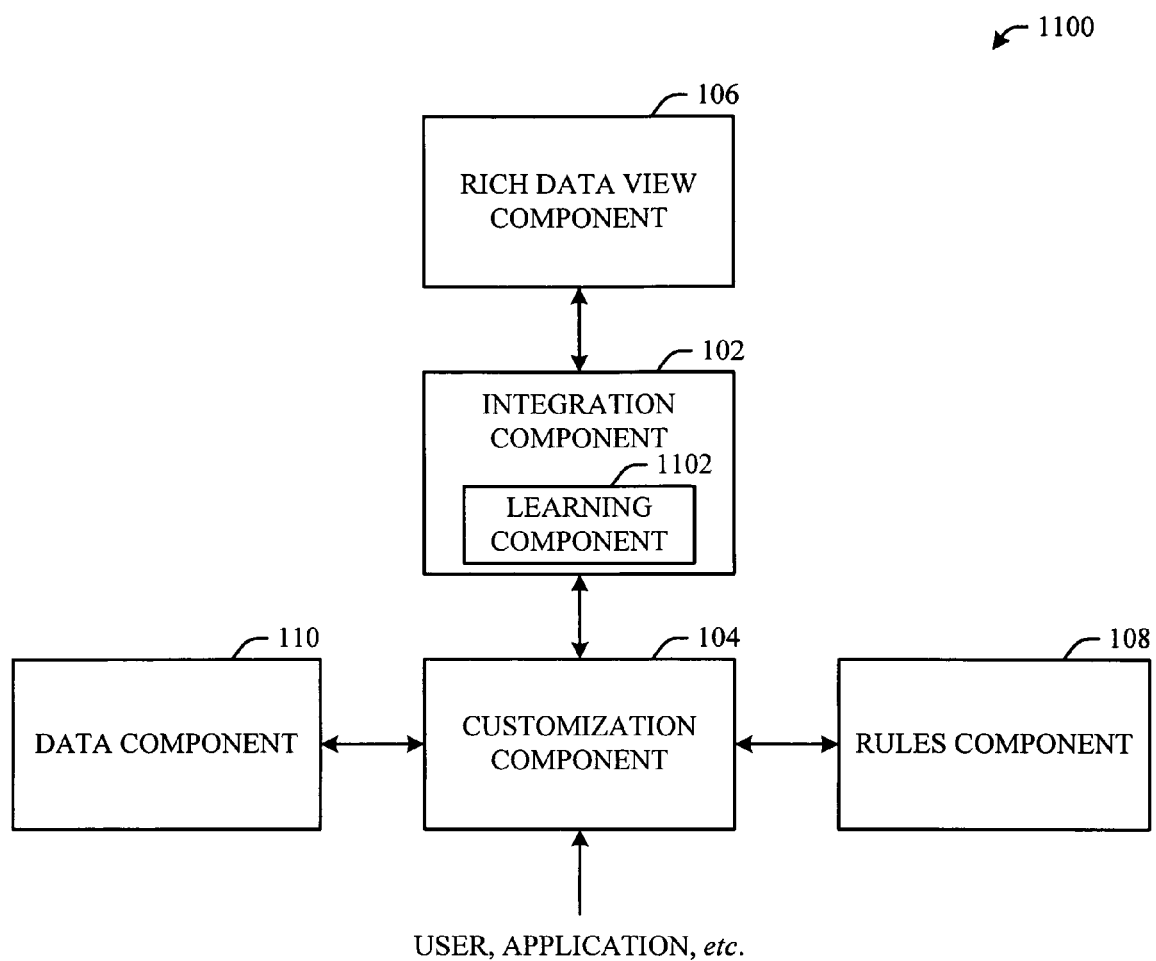
FIG. 11 illustrates a system that employs a learning component in accordance with the present invention.

Referring now to FIG. 11, there is illustrated a system 1100 that employs a learning component 1102 in accordance with the subject invention. More particular, the system 1100 includes the learning component 1102 integral to the integration component 102 that facilitates the exposing a rich data view in an application to an end-user.

The subject invention can employ various artificial intelligence based schemes (e.g., via learning component 1102) for carrying out various aspects of the subject invention. For example, a process for determining the selection of UI elements to be presented based on confidence or classification to provide the best elements for the users consideration can be facilitated via an automatic classifier system and process. A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

Figure 12:
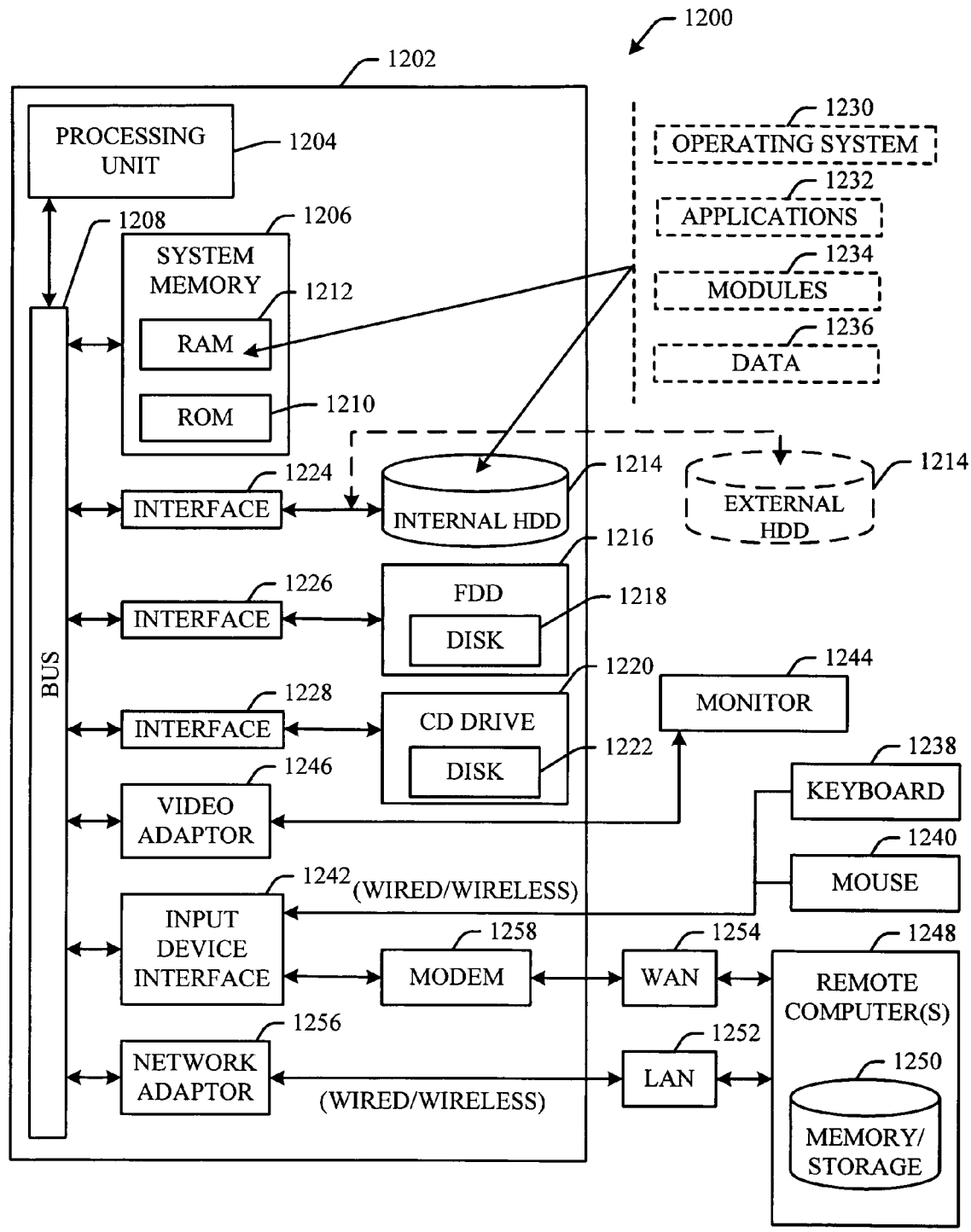
FIG. 12 illustrates a block diagram of a computer operable to execute the disclosed architecture.

As will be readily appreciated from the subject specification, the subject invention can employ classifiers that are explicitly trained (e.g., via a generic training data) as well as implicitly trained (e.g., via observing user behavior, receiving extrinsic information). For example, SVMs are configured via a learning or training phase within a classifier constructor and feature selection module. Thus, the classifier(s) can be used to automatically perform a number of functions, including but not limited to determining the selection of UI elements to be presented based on confidence or classification to provide the best elements for the users' consideration Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject invention.

The drives and their associated computer-readable media provide non-volatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 13:
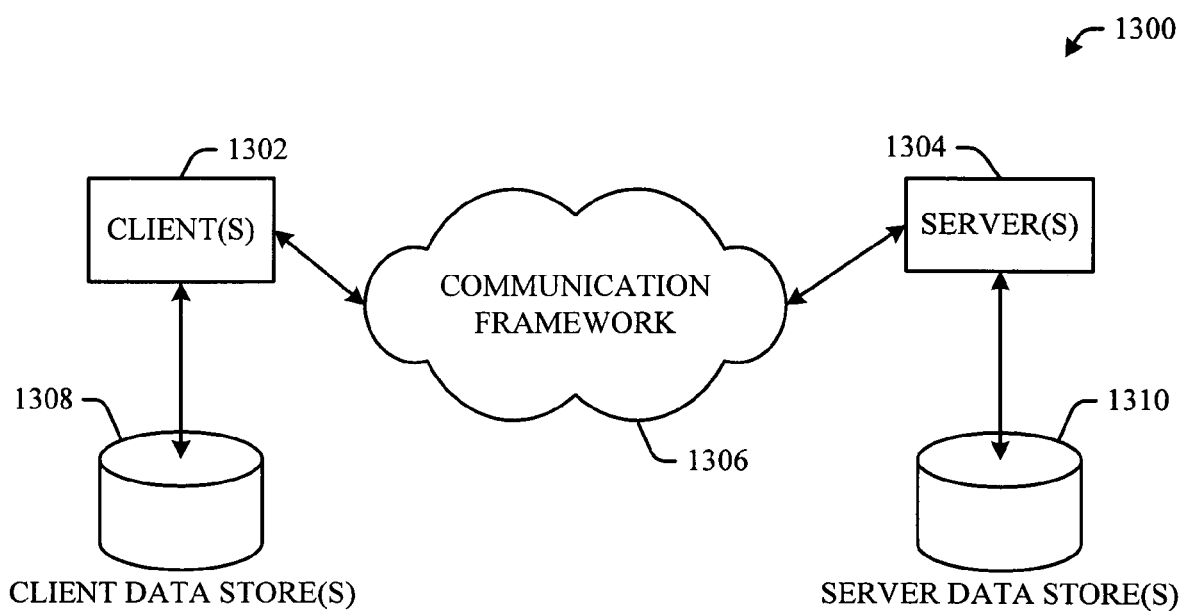
FIG. 13 illustrates a schematic block diagram of an exemplary computing environment in accordance with the present invention.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communications network such as the Internet) that can be employed to facilitate communications between the client(s) 1302 and the server(s) 1304. Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system including a processor and memory that facilitates data management, comprising:
  a rich data view component that renders a customization component to an end user, the customization component allows the end user to select a file type having an associated set of properties, to create a new property, and to add the end-user-created property to the set of properties associated with the selected file type, the rich data view component forming part of a file explorer configured to display a plurality of files including files of the selected file type, the file explorer configured to allow the end user to sort the files of the selected file type based on values of the added end-user-created property;
  a media-editing application including a user interface; and
  an integration component that interfaces the customization component with the rich data view component and that integrates the end-user-created property into the media-editing application to allow the end user to use the user interface of the media-editing application to access the end-user-created property, which was created using the rich data view component of the file explorer.

2. The system of claim 1, wherein the integration component processes application data at least one of externally and internally to return a result to the rich data view component.

3. The system of claim 1, wherein the customization component is a dynamic set component that facilitates defining a subset of application data.

4. The system of claim 1, wherein the file explorer is configured to allow the end user to filter the files of the selected file type based on values of the end-user-created property.

5. The system of claim 1, wherein the end-user-created property is a static property.

6. The system of claim 1, wherein the end-user-created property is a computed property.

7. The system of claim 1, wherein the selected file type comprises a media file type; wherein the media file type has an associated set of actions that may be taken with respect to the media file type; wherein the customization component allows the end user to add an end-user-defined media-content-editing action to the set of actions associated with the media file type; wherein the file explorer is configured to present the end-user-defined media-content-editing action in response to a selection of a media file of the media file type; and wherein the file explorer is configured to, in response to a selection of the end-user-defined media-content-editing action presented by the file explorer, launch a process that automatically edits the selected media file according to the presented media-content-editing action.

8. The system of claim 7, wherein the media file is an image file; wherein the presented end-user-defined media-content-editing action comprises red eye reduction; and wherein the file explorer is configured to, in response to the selection of the red eye reduction, launch a process that automatically performs the red eye reduction on the image file.

9. The system of claim 1, wherein the customizing component represents an end-user defined relationship between elements in a store, the relationship is at least one of common value based and link based.

10. A computer-readable storage medium having stored thereon computer-executable instructions for carrying out the system of claim 1.

11. A computer-readable storage medium having computer-executable instructions for performing a method of facilitating a rich data view, the method comprising:
defining an end-user programmable component to an end user, the end-user programmable component facilitates allowing the end user to program one or more programmatic rules relating to functionality associated with data for a first application and a second application, the first application comprising a media file editor configured to edit the media content of media files, the second application comprising a file explorer configured to display a plurality of files;
associating the one or more end-user-programmed rules with a media file type, at least one of the one or more end-user-programmed rules associated with the media file type configuring the file explorer to automatically present a first media-content-editing action in response to a selection of media files of the media file type, the at least one of the one or more end-user-programmed rules configuring the file explorer to, in response to a selection of the first end-user-defined media-content-editing action presented by the file explorer, cause the media file editor to automatically edit the selected media files according to the first media-content-editing action;
rendering a processed subset of the data into the rich data view in accordance with the one or more programmatic rules;
by the file explorer, automatically presenting the first media-content-editing action in response to the selection of media files of the media file type; and
by the file explorer, in response to the selection of the first end-user-defined media-content-editing action, causing the media file editor to automatically edit the selected media files according to the first media-content-editing action.

12. The medium of claim 11, wherein the media files are image files; wherein the first end-user-defined media-content-editing action comprises red eye reduction; and wherein the at least one of the one or more end-user-programmed rules configure the file explorer to, in response to the selection of the red eye reduction, cause the media file editor to automatically perform the red eye reduction on the image files.

13. The medium of claim 11, wherein the method further comprises returning the subset of the data from processing in accordance with the one or more rules.

14. The medium of claim 11, wherein the end-user programmable component facilitates defining the subset of the data.

15. The medium of claim 11, wherein the method further comprises at least one of:
associating one or more view definitions with a type or instance of a type; and
associating the one or more rules to define relationships between types or instances of types.

16. The system of claim 11, wherein the end-user programmable component is at least one of a dataset definition component, a data property definition component and a data relationship definition component.

17. A computer implemented system including a processor and memory that facilitates data management, comprising:
a customization component that facilitates end-user definition of functional programmatic features related to a first application and a second application, the first application comprising an image file editor configured to edit the image content of image files, the second application comprising a file explorer configured to display a plurality of files, the functional programmatic features including a first image-editing action;
a first rich data view component that can render a first user interface configured to present the first image-editing action, the first rich data view component forming part of the image file editor;
a second rich data view component that can render a second user interface configured to present the first image-editing action, the second rich data view component forming part of the file explorer, the end-user-defined functional programmatic features configuring the file explorer to automatically present the second rich data view component in response a selection of an image file, the end-user-defined functional programmatic features configuring the file explorer to, in response to a selection of the first-image-editing action presented by the second user interface rendered by the second rich data view component of the file explorer, launch a process that automatically edits the selected image file according to the first-image-editing action;
an integration component that interfaces the customization component with the first and second rich data view components to facilitate end-user programming related to the image file editor and the file explorer;

a display for displaying a rendering of the first rich data view component as part of the image file editor and displaying a rendering of the second rich data view as part of the file explorer;

by the file explorer, automatically presenting the second rich data view component in response the selection of the image file; and by the file explorer, in response to the selection of the first-image-editing action presented by the second user interface rendered by the second rich data view component of the file explorer, launching a process that automatically edits the selected image file according to the first-image-editing action.

18. The system of claim 17, wherein the first-image-editing action comprises red eye reduction; and wherein the end-user-defined functional programmatic features configure the file explorer to, in response to the selection of the red eye reduction, launch a process that automatically performs the red eye reduction on the selected image file.

* * * * *